United States Patent Office 2,941,988
Patented June 21, 1960

2,941,988

PROCESS FOR THE ALKOXYLATION OF POLYVINYL ALCOHOL

Ernest Wolf, Niagara Falls, N.Y., assignor to Olin Mathieson Chemical Corporation, a corporation of Virginia No Drawing. Filed Apr. 2, 1956, Ser. No. 575,369

2 Claims. (Cl. 260—91.3)

My invention relates to an improved method for reacting lower alkylene oxides with polyvinyl alcohol.

Polyvinyl alcohol is commercially available in a wide variety of types. It is conventionally prepared from polyvinyl acetates by replacement of the acetate groups by hydroxyl groups, generally with the aid of an alkaline catalyst. Usually, the commercially available polyvinyl alcohols are of a viscosity such that a 4 percent by weight aqueous dispersion in water at 20° C. will have a viscosity of from about 5 to about 55 centipoises, although other polyvinyl alcohols can also be made available. In the past, the reaction between polyvinyl alcohol and lower alkylene oxides has been carried out either by contacting the oxides directly with the polyvinyl alcohol under moderate conditions of temperature and pressure, or by dissolving the polyvinyl alcohol in water and treating the solution with the oxide.

The former process is very difficult to control when it is desired to produce an evenly alkoxylated product, certain molecules containing many more alkoxy units than others. When done in this way, there is no convenient method for stopping the reaction at any but the highest degree of alkoxylation. Unless the direct reaction is carried out under carefully controlled conditions, local charring of the polymer will result. Because of the explosion hazard involved in carrying out reactions in a large body of alkylene oxide, it is doubtful that this procedure can be applied industrially.

Dissolving the polymer in water, and later adding the alkylene oxide has the advantage of producing a reaction which is controllable and uniform. However, this method is beset with the problem of glycol formation, as it is impossible to completely inhibit the hydrolysis of the oxide even in basic solution. A more serious drawback presents itself when isolation of the alkoxylated product is attempted. As the water is removed, a swollen plastic mass forms due to the absorption of water by the precipitating product. The drying of this mass is difficult since the product begins decomposing at about 125° C. Even after the water is removed, it is usually necessary to mechanically pulverize the mass before the product can be used. During the comminuting step local heating will cause decomposition. Alternatively the alkoxylated product can be precipitated from the water solution by by the addition of an insolubilizing agent such as methanol. Even when this is done, the product is not dry but contains some water.

It is the object of my invention to provide a method for alkoxylating polyvinyl alcohol which has none of the above-listed disadvantages, whereby the reaction proceeds smoothly and safely to the desired degree of alkoxylation with little or no loss of reactants by charring or by hydrolysis, and the product is easily recovered in substantially the same state of subdivision as was the polyvinyl alcohol prior to the start of the reaction. In accordance with my invention, I have discovered that all of these advantages can be realized if the reaction is carried out by introducing the lower alkylene oxide into an agitated mixture of polyvinyl alcohol and any of certain liquid hydrocarbons or mixtures thereof. The liquid hydrocarbons which I employ in my process are those which have boiling points at atmospheric pressure within the range from about −10° C. to 200° C. and which are either saturated hydrocarbons or aromatic hydrocarbons. Thus, among the hydrocarbons which I can employ are paraffins such as normal butane, normal pentane, normal hexane, normal heptane, normal octane, 2,2,4-trimethylpentane, and so forth; cycloparaffins, such as cyclopentane, methylcyclopentane, dimethylcyclopentane, cyclohexane, methylcyclohexane, dimethylcyclohexane and so forth; and aromatic and alkyl aromatic hydrocarbons such as benzene, toluene, ethylbenzene, and xylenes, cumene, mesitylene, paracymene and so forth. In general, the reaction mixture will contain from about 35 parts to about 75 parts by weight of polyvinyl alcohol, per 100 parts by weight of the hydrocarbon.

As the lower alkylene oxide there can be employed ethylene oxide, propylene oxide, 1,2-butylene oxide or 2,3-butylene oxide, or mixtures thereof, and generally from about 25 to about 150 parts by weight of lower alkylene oxide per 100 parts by weight of polyvinyl alcohol will be introduced into the reaction mixture. The reaction temperature will generally be within the range from about 50 to 150° C. Also, the reaction mixture will contain an alkoxylation catalyst, generally in amount within the range from 0.1 to 2.0 percent by weight, based upon the weight of the polyvinyl alcohol. The alkoxylation catalysts which are useful are those which have a basic reaction, including alkali metal and alkali earth metal hydroxides such as sodium hydroxide, potassium hydroxide, barium hydroxide, calcium hydroxide and magnesium hydroxide; tertiary organic bases such as aniline, dimethyl aniline, trimethylamine, triethylamine and pyridine; and salts which have a basic reaction, such as sodium acetate, sodium oxalate and trisodiumphosphate.

In a preferred embodiment of my invention, the polyvinyl alcohol is suspended in either benzene or butane and the catalyst is added in the amount of about 2 percent by weight, based upon the weight of the polyvinyl alcohol. The temperature of the mixture is then raised to between 50 to 100° C. Thorough agitation is maintained and the alkylene oxide is admitted above the liquid level at a pressure of from 1 to 15 atmospheres whereupon the alkylene oxide dissolves in the liquid and reacts with the polyvinyl alcohol. When the desired amount of oxide has been introduced, the reaction is stopped and the suspended product is recovered by filtration. In another embodiment of my invention, the oxide is introduced below the surface of the agitated mixture, in either liquid or vapor form.

The products produced by practicing my invention are useful as sizing agents for textile fibers, as thickeners, for the preparation of oil resistant but water soluble films, and for other purposes.

The following examples further illustrate my invention.

*Example I*

400 grams of polyvinyl alcohol containing 38 percent hydroxyl groups, a low percentage of ether linkages, and less than 2 percent residual acetate groups, was suspended with vigorous agitation in 750 grams of toluene. Four grams of triethylamine was then added to the slurry and the temperature was raised to from 95 to 97° C. After purging the reaction vessel with $N_2$ and evacuating, ethylene oxide under a pressure of about 2 atmospheres was introduced into the reactor above the surface of the slurry. After 154 grams of ethylene oxide (elapsed time about 6 hours) had been introduced the reaction was stopped and the reaction mixture cooled to room temperature. The reaction mixture was then filtered whereupon 555 grams of ethoxylated polyvinyl alcohol was recovered. In this way 39 percent of the OH groups present in the original polyvinyl alcohol were replaced.

Example II

Another 400 gram sample of the polyvinyl alcohol used in Example I above was slurried into 750 grams of xylene. Approximately 4 grams of triethylamine was then added to the slurry, the temperature was raised to 90 to 92° C., and ethylene oxide was introduced above the surface of the slurry at a pressure of about 2 atmospheres, while the latter was being vigorously agitated. After 5 hours, 125 grams of ethylene oxide was taken up by the reaction mixture, and the reaction was stopped. After cooling to room temperature, the reaction mixture was filtered wherepon 511 grams of ethoxylated polyvinyl alcohol was recovered. This corresponds to about 28 percent of the original hydroxyl groups replaced.

Example III 100 grams of a polyvinyl alcohol containing 38 percent hydroxyl groups, a low percentage of ether linkages, and less than 2 percent residual acetate groups, was slurried into 400 milliliters of benzene with vigorous agitation. 1.2 grams of 50 percent aqueous KOH was then added to the slurry and the temperature raised to 90° C. Ethylene oxide was then introduced into the vessel above the surface of the slurry at a pressure of 2 atmospheres for 5 hours. At the end of this time, 100 grams of ethylene oxide had been absorbed by the slurry and the reaction was stopped. There was recovered upon filtration 153 grams of the ethoxylated polyvinyl alcohol corresponding to about 60 percent of the original OH groups replaced.

Example IV 100 grams of polyvinyl alcohol, 190 grams of butane, and 1.0 gram of triethylamine were charged to a stainless steel autoclave. 30 grams of ethyleen oxide were added and the temperature raised to 90° C. During this time, the pressure reached 175 p.s.i. After 5 hours, the butane was flashed off and the product was dried. The product weighed 121 grams corresponding to 23 percent of the original OH groups replaced.

I claim:

1. A method for the alkoxylation of polyvinyl alcohol which comprises introducing a lower alkylene oxide into an agitated mixture of polyvinyl alcohol and liquid butane in the proportion of from about 35 parts to about 75 parts by weight of polyvinyl alcohol per 100 parts by weight of liquid butane while the reaction mixture contains an alkoxylation catalyst, and maintaining the resulting mixture in the range of from about 50° to 150° C. under conditions to maintain butane in liquid form at the reaction temperature for a time sufficient to effect alkoxylation of polyvinyl alcohol.

2. The method of claim 1 wherein said lower alkylene oxide is ethylene oxide.

References Cited in the file of this patent

UNITED STATES PATENTS

| 2,145,345 | Dreyfus | Jan. 31, 1939 |

FOREIGN PATENTS

| 368,530 | Great Britain | Mar. 10, 1932 |
| 575,141 | Germany | Apr. 25, 1933 |